(12) United States Patent
Lee

(10) Patent No.: US 10,094,967 B2
(45) Date of Patent: *Oct. 9, 2018

(54) OPTICAL MEMBER HAVING QUANTUM DOT AND DIFFUSING PARTICLE LAYER, DISPLAY DEVICE INCLUDING THE SAME, METHOD FOR MANUFACTURING THE SAME

(71) Applicant: LG INNOTEK CO., LTD., Seoul (KR)

(72) Inventor: Sahng Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,355

(22) Filed: Oct. 5, 2015

(65) Prior Publication Data

US 2016/0025918 A1 Jan. 28, 2016

Related U.S. Application Data

(63) Continuation of application No. 14/119,821, filed as application No. PCT/KR2011/009401 on Dec. 7, 2011, now abandoned.

(30) Foreign Application Priority Data

May 24, 2011 (KR) .................. 10-2011-0049269

(51) Int. Cl.
*F21V 8/00* (2006.01)
*G02B 5/02* (2006.01)
(Continued)

(52) U.S. Cl.
CPC .............. *G02B 6/0051* (2013.01); *F21V 9/30* (2018.02); *G02B 5/0242* (2013.01);
(Continued)

(58) Field of Classification Search
CPC ... G02F 2001/133614; G02F 1/133606; G02B 5/0236–5/0242; G02B 5/0294; G02B 6/0051

See application file for complete search history.

(56) References Cited

U.S. PATENT DOCUMENTS 5,706,134 A * 1/1998 Konno ................. G02B 5/0226
359/452
5,881,201 A * 3/1999 Khanarian ........... G02B 6/0041
385/146

(Continued)

FOREIGN PATENT DOCUMENTS

KR 20-0321798 Y1 7/2003
KR 10-2010-009485 A 1/2010
(Continued)

OTHER PUBLICATIONS

U.S. Appl. No. 14/119,821, filed Nov. 22, 2013.*
U.S. Appl. No. 61/412,004, filed Nov. 10, 2010, provisional Application of US PGPub 2012/0113672 A1.*

*Primary Examiner* — Anh Mai
*Assistant Examiner* — Steven Horikoshi
(74) *Attorney, Agent, or Firm* — Birch, Stewart, Kolasch & Birch, LLP

(57) ABSTRACT

Disclosed are an optical sheet, a display device including the same, and a method for manufacturing the same. The optical sheet includes a host layer, a plurality of wavelength conversion particles in the host layer, and a plurality of optical path change particles in the host layer.

7 Claims, 5 Drawing Sheets

(51) Int. Cl.
*F21V 9/30* (2018.01)
*G02F 1/1335* (2006.01)
*B82Y 20/00* (2011.01)

(52) U.S. Cl.
CPC ........... *G02B 5/0294* (2013.01); *G02B 6/005* (2013.01); *G02F 1/133606* (2013.01); *B82Y 20/00* (2013.01); *G02F 2001/133614* (2013.01); *Y10S 977/774* (2013.01)

(56) References Cited

U.S. PATENT DOCUMENTS

| | | | |
|---|---|---|---|
| 6,501,091 | B1 | 12/2002 | Bawendi et al. |
| 2002/0113534 | A1* | 8/2002 | Hayashi ................ F21V 29/004 |
| | | | 313/113 |
| 2002/0140347 | A1 | 10/2002 | Weaver |
| 2003/0164677 | A1* | 9/2003 | Miyaguchi .......... H01L 51/5253 |
| | | | 313/504 |
| 2006/0268537 | A1 | 11/2006 | Kurihara et al. |
| 2007/0121227 | A1 | 5/2007 | Wang et al. |
| 2008/0130286 | A1* | 6/2008 | Hartter ...................... B32B 3/28 |
| | | | 362/268 |
| 2008/0159083 | A1* | 7/2008 | Kawakami ............. G04C 10/02 |
| | | | 368/232 |
| 2008/0302977 | A1 | 12/2008 | Yao et al. |
| 2009/0052195 | A1 | 2/2009 | Saneto et al. |
| 2009/0091045 | A1 | 4/2009 | Tanikawa et al. |
| 2009/0135490 | A1* | 5/2009 | Lee ...................... G02B 5/0221 |
| | | | 359/599 |
| 2009/0152567 | A1 | 6/2009 | Comerford et al. |
| 2010/0193806 | A1 | 8/2010 | Byun |
| 2010/0329085 | A1 | 12/2010 | Kawamori et al. |
| 2011/0006316 | A1 | 1/2011 | Ing et al. |
| 2011/0096402 | A1 | 4/2011 | Sun et al. |
| 2012/0113672 | A1* | 5/2012 | Dubrow ................ B82Y 20/00 |
| | | | 362/602 |

FOREIGN PATENT DOCUMENTS

| | | |
|---|---|---|
| KR | 10-2010-0047841 A | 5/2010 |
| TW | 200923497 A | 6/2009 |
| TW | 201042294 A1 | 12/2010 |
| TW | 201113560 A1 | 4/2011 |
| TW | 201115177 A1 | 5/2011 |

* cited by examiner

OPTICAL MEMBER HAVING QUANTUM DOT AND DIFFUSING PARTICLE LAYER, DISPLAY DEVICE INCLUDING THE SAME, METHOD FOR MANUFACTURING THE SAME

CROSS-REFERENCE TO RELATED APPLICATIONS

This application is a Continuation of co-pending application Ser. No. 14/119,821 filed on Nov. 22, 2013, which is the national phase of PCT International Application No. PCT/KR2011/009401 filed on Dec. 7, 2011, and which claims priority to Application No. 10-2011-0049269 filed in the Republic of Korea on May 24, 2011. The entire contents of all of the above applications are hereby incorporated by reference.

BACKGROUND

The embodiment relates to an optical member, a display device including the same, and a method for manufacturing the same.

Recently, flat display devices, such as an LCD (liquid crystal display), a PDP (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been mainly developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness greater than thickness of the edge-illumination type backlight unit in order to ensure brightness uniformity.

In order to solve the above problem, a quantum dot bar having a plurality of quantum dots, which can convert blue light into red light or green light when receiving the blue light, is positioned in front of a blue LED that emits the blue light. Thus, as the blue light is irradiated onto the quantum dot bar, the blue light, the red light and the green light are mixed to each other by the quantum dots distributed in the quantum dot bar and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED, which emits blue light, to supply signals and power to the LEDs and a bonding member formed under the bottom surface of the FPCB.

The display device capable of displaying various images using the white light supplied to the light guide plate through the quantum dot bar as the blue light is emitted from the blue LED has been extensively used.

A display device employing the quantum dots has been disclosed in Korean Patent Unexamined Publication No. 10-2011-0068110.

SUMMARY

The embodiment provides an optical member, which can be easily manufactured and represent improved optical performance, a display device, and a method for manufacturing the same.

According to the embodiment, an optical member includes a host layer, a plurality of wavelength conversion particles in the host layer, and a plurality of optical path change particles in the host layer.

According to the embodiment, a display apparatus includes the optical member.

According to the embodiment, a method for manufacturing an optical member includes providing a plurality of wavelength conversion particles and a plurality of optical path change particles, and forming a host layer surrounding the wavelength conversion particles and the optical path change particles.

As described above, since the optical member according to the embodiment includes wavelength conversion particles and optical path change particles, the wavelength of the incident light can be converted, and the path of the incident light can be changed.

Therefore, the optical member according to the embodiment has both a wavelength conversion function and a light diffusion function. In other words, the optical member according to the embodiment can act as both a wavelength conversion sheet and a wavelength conversion diffusion sheet.

In addition, the path of the light passing through the optical member according to the embodiment can be increased due to the optical path change particles. Therefore, light incident onto the optical member according to the embodiment can be effectively changed by wavelength conversion particles.

In other words, due to the optical path change particles, light can be effectively incident onto the wavelength conversion particles and the utilization of the wavelength conversion particles can be maximized. In addition, the wavelengths of a greater amount of lights can be converted by a small number of wavelength conversion particles, due to the combination of the optical path change particles and the wavelength conversion particles.

Therefore, the optical member according to the embodiment can realize more improved color reproduction and more improved brightness due to the combination of the optical path change particles and the wavelength conversion particles even if a smaller number of wavelength conversion particles may be used.

Accordingly, the optical member and the display device according to the embodiment can be easily manufactured with improved optical performance.

DETAILED DESCRIPTION OF THE EMBODIMENTS

Figure 1:
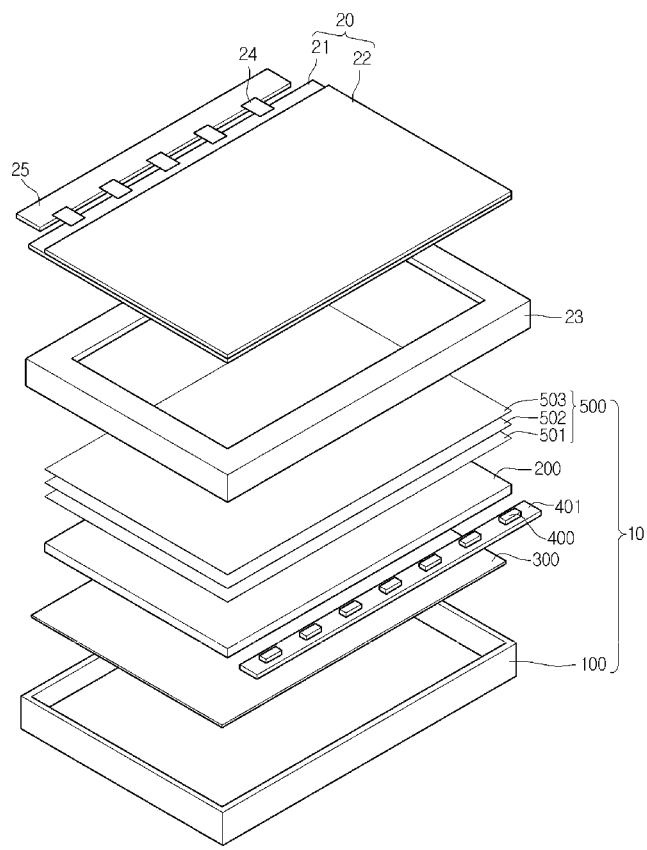
FIG. 1 is a perspective view showing a liquid crystal display according to the embodiment.

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
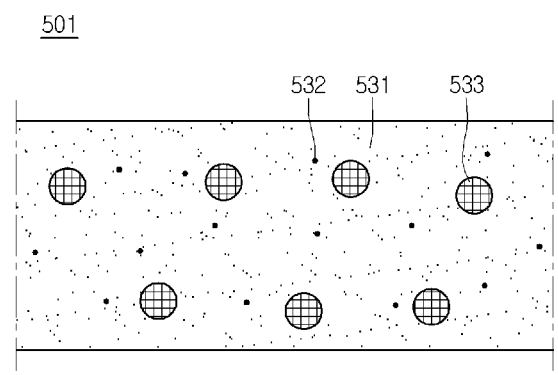
FIG. 2 is a sectional view showing a wavelength conversion diffusion sheet.
Figure 3:
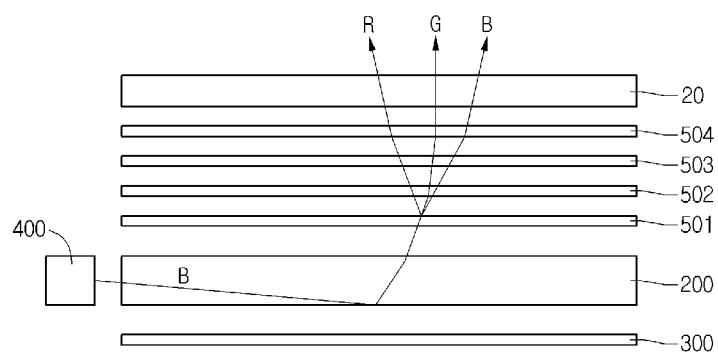
FIG. 3 is a view showing a procedure of displaying an image by the liquid crystal display according to the embodiment.
Figure 4:
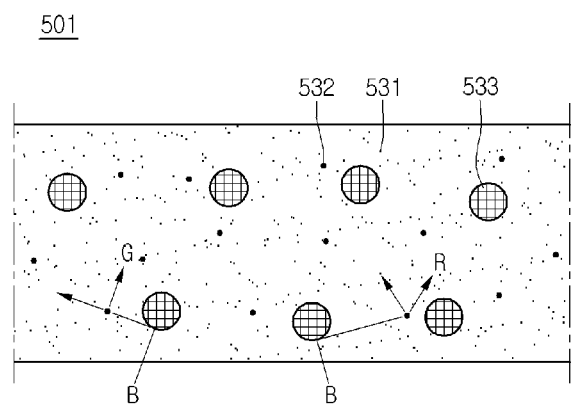
FIG. 4 is a view showing a light traveling procedure within a wavelength conversion diffusion sheet.

FIG. 1 is a perspective view showing an LCD (Liquid Crystal Display) according to the embodiment, and FIG. 2 is a sectional view showing a wavelength conversion diffusion sheet. FIG. 3 is a view showing a procedure of displaying an image by the LCD according to the embodiment, and FIG. 4 is a view showing a light traveling procedure within a wavelength conversion diffusion sheet.

Referring to FIGS. 1 to 4, the LCD according to the embodiment includes a backlight unit 10 and a liquid crystal panel 20.

The backlight unit 10 supplies light to the liquid crystal panel 20. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a light guide plate 200, a reflective sheet 300, a plurality of light emitting diodes 400, a printed circuit board 401, and a plurality of optical sheets 500.

The upper portion of the bottom cover 100 is open. The bottom cover 100 receives the light guide plate 200, the light emitting diodes 400, the printed circuit board 401, the reflective sheet 300, and the optical sheets 500 therein.

The light guide plate 200 is disposed in the bottom cover 100 and arranged on the reflective sheet 300. The light guide plate 200 guides the light upward by totally-reflecting, refracting and scattering the light incident thereto from the light emitting diodes 400.

The reflective sheet 300 is disposed under the light guide plate 200. In more detail, the reflective sheet 300 is disposed between the light guide plate 200 and the bottom surface of the bottom cover 100. The reflective sheet 300 reflects the light upward as the light is output downward from the bottom surface of the light guide plate 200.

The light emitting diodes 400 serve as a light source for generating the light. The light emitting diodes 400 are disposed at one lateral side of the light guide plate 200. The light generated from the light emitting diodes 400 is incident into the light guide plate 200 through the lateral side of the light guide plate 200.

The light emitting diodes 400 may include a blue light emitting diode generating the blue light or a UV light emitting diode generating the UV light. In detail, the light emitting diodes 400 may emit the blue light having the wavelength band of about 430 nm to 470 nm or the UV light having the wavelength band of about 300 nm to 400 nm.

The light emitting diodes 400 are mounted on the printed circuit board 401. The light emitting diodes 400 may be disposed under the printed circuit board 401. The light emitting diodes 400 are driven by receiving a driving signal through the printed circuit board 401.

The printed circuit board 401 is electrically connected to the light emitting diodes 400. The printed circuit board 401 may mount the light emitting diodes 400 thereon. The printed circuit board 401 is disposed in the bottom cover 100.

The optical sheets 500 are disposed on the light guide plate 200. The optical sheets 500 supplies the light to the liquid crystal panel 20 by changing or enhancing the optical property of the light output from the top surface of the light guide plate 200.

The optical sheets 500 include a wavelength conversion diffusion sheet 501, a first prism sheet 502 and a second prism sheet 503.

The wavelength conversion diffusion sheet 501 is disposed on the light guide plate 200. In addition, the wavelength conversion diffusion sheet 501 is disposed below the liquid crystal panel 20. In more detail, the wavelength conversion diffusion sheet 501 can be disposed between the light guide plate 200 and the first prism sheet 502.

The wavelength conversion diffusion sheet 501 is an optical member to change or enhance the characteristic of light emitted from the light emitting diodes 400. In other words, the wavelength conversion diffusion sheet 501 is an optical member to change or enhance the characteristic of light emitted from the light emitting diodes 400, so that the light from the light emitting diodes 400 is incident onto the liquid crystal panel 20.

The wavelength conversion diffusion sheet 501 may output the incident light upward by changing the wavelength of the incident light. In addition, the wavelength conversion diffusion sheet 501 may output the incident light upward by enhancing the uniformity of the incident light.

For instance, if the light emitting diodes 400 are blue light emitting diodes, the wavelength conversion diffusion sheet 501 converts the blue light output upward from the light guide plate 200 into the green light and the red light. In detail, the wavelength conversion diffusion sheet 501 converts a part of the blue light into the green light having the wavelength in the range of about 520 nm to about 560 nm, and a part of the blue light into the red light having the wavelength in the range of about 630 nm to about 660 nm.

In addition, if the light emitting diodes 400 are UV light emitting diodes, the wavelength conversion diffusion sheet 501 converts the UV light output from the top surface of the light guide plate 200 into the blue light, the green light and the red light. In detail, the wavelength conversion diffusion sheet 501 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion diffusion sheet 501 without being converted and the lights converted by the wavelength conversion diffusion sheet 501. In detail, the white light can be incident into the liquid crystal panel 20 through the combination of the blue light, the green light and the red right.

In this case, the white light output from the wavelength conversion diffusion sheet 501 may have more enhanced uniformity than that of the blue light or the UV light incident onto the wavelength conversion diffusion sheet 501.

As shown in FIG. 2, the wavelength conversion diffusion sheet 501 includes a host layer 531, a plurality of wavelength conversion particles 532, and a plurality of optical path change particles 533. The wavelength conversion diffusion sheet 501 may have a single layer structure.

The host layer 531 contains the wavelength conversion particles 532 and the optical path change particles 533. In other words, the wavelength conversion particles 532 and the optical path change particles 533 are uniformly distributed in the host layer 531.

The host layer 531 is transparent and has a high sealing property. In more detail, the host layer 531 may have a low oxygen transmission rate.

In addition, the host layer 531 may include high-density polymers. For example, the host layer 531 may include polymers having a density of about 1.0 g/ml to about 2.0 g/ml. The host layer 531 may include polymer having a refractive index in the range of about 1.4 to about 1.6.

The host layer 531 may include epoxy resin, acrylic resin, polyimide resin, or silicon resin. In more detail, the host layer 531 may include silicon resin.

The silicon resin may have a framework structure having a siloxane (—SI—O—) bond. In addition, a methyl group, a phenyl group, or a hydroxyl group may be added to the siloxane framework.

For example, the silicon resin may be expressed as following chemical formula 1.

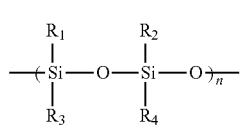

Chemical Formula 1

In chemical formula 1, each of R1, R2, R3, and R4 can be independently selected from the group consisting of hydrogen, halogen, alkyl, aryl, cyclo alkyl, and hetero aryl groups.

In addition, the host layer 531 may further include a cross linking agent. The sealing property of the host layer 531 may be more enhanced by the cross linking agent. About 20 wt % to about 25 wt % of the cross linking agent may be contained in the host layer 531.

The cross linking agent may include one selected from the group consisting of 1,6-hexanediol diacrylate, dipropylene glycol diacrylate, neopentyl glycol diacrylate, trimethylolpropane triacrylate, ethoxylated trimethylolpropane triacrylate, trimethylolpropane trimethacrylate, pentaerythritol tetraacrylate, dipentaerylthritol hexaacrylate, vinyltriethoxysilane, vinyltrimethoxysilane, vinyl-tris-(2-methoxyethoxy) silane, and vinylmethyldimethoxysilane.

In addition, the host layer 531 may include a metal salt. In more detail, the host layer 531 may further include a platinum salt. The scaling property of the host layer 531, in more detail, the oxygen blocking characteristic of the host layer 531 can be improved by the platinum salt. The host layer 531 may contain about 0.001 wt % to about 0.01 wt % of the platinum salt.

The platinum salt may include platinum amine, platinum chloride, or platinum ammonium.

In addition, the host layer 531 may include a thermoplastic resin. In more detail, the host layer 531 is transparent, and may include a thermoplastic resin representing high air tightness.

For example, the host layer 531 includes a polymer or a copolymer including a monomer expressed as following chemical formula 2. In more detail, the host layer 531 may include the polymer or the copolymer.

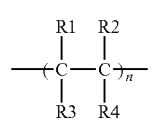

Chemical Formula 2

In this case, at least one of the R1, R2, R3, and R4 is a chlorine group, a nitrile group, or a hydroxyl group. A functional group among the R1, R2, R3, and R4, which is not selected as the chlorine group, the nitrile group, or the hydroxyl group, may be selected from the group consisting of hydrogen, a substituted alkyl group, a non-substituted alkyl group, a substituted aryl group, a non-substituted aryl group, a substituted alkoxy group, a non-substituted alkoxy group, a substituted heteroaryl group, and a non-substituted heteroaryl group. In this case, the n may be in the range of about 1 to about 10000.

According to one embodiment, at least one of the R1, R2, R3, and R4 is a chlorine group, a nitrile group, or a hydroxyl group, and a functional group of the R1, R2, R3, and R4, which is not selected as the chlorine group, the nitrile group, or the hydroxyl group, may be hydrogen.

According to one embodiment, the R4 is a nitrile group, and each of the R1, R2, and R3 may be selected from the group consisting of hydrogen, a substituted alkyl group, a non-substituted alkyl group, a substituted aryl group, a non-substituted aryl group, a substituted alkoxy group, a non-substituted alkoxy group, a substituted heteroaryl group, and a non-substituted heteroaryl group.

According to one embodiment, the R4 and R4 are chlorine groups, and each of the R1 and R2 may be selected from the group consisting of hydrogen, a substituted alkyl group, a non-substituted alkyl group, a substituted aryl group, a non-substituted aryl group, a substituted alkoxy group, a non-substituted alkoxy group, a substituted heteroaryl group, and a non-substituted heteroaryl group.

According to one embodiment, the R4 is a hydroxyl group and each of the R1, R2, and R3 may be selected from the group consisting of hydrogen, a substituted alkyl group, a non-substituted alkyl group, a substituted aryl group, a non-substituted aryl group, a substituted alkoxy group, a non-substituted alkoxy group, a substituted heteroaryl group, and a non-substituted heteroaryl group.

According to the embodiment, the host layer 531 may include a polymer or a copolymer including a monomer expressed as following chemical formula 3.

Chemical Formula 3

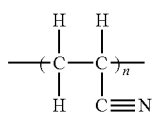

In this case, the n may be range of 1 to 10000.

In more detail, the polymer or the copolymer may include poly-acrylic-nitrile (PAN).

According to one embodiment, the host layer 531 may include a polymer or a copolymer including a monomer expressed as following chemical formula 4.

Chemical Formula 4

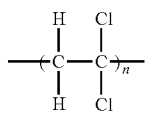

In this case, the n may be in the range of 1 to 10000.

In more detail, the polymer or the copolymer may include polyvinylidene chloride (PVDC).

According to one embodiment, the host layer 531 may include a polymer or a copolymer expressed as following chemical formula 5.

Chemical Formula 5

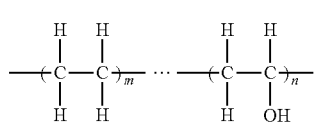

In this case, the n may be in the range of 1 to 10000, and the m may be in the range of 1 to 10000.

In more detail, the polymer or the copolymer may include ethylene vinylalcohol (EVOH).

The host layer 531 is transparent, and has a low moisture transmission rate and/or a low oxygen transmission rate. For example, the moisture transmission rate of the host layer 531 may be in the range of about 0.05 (cc mm/100 in 2 24 hr atm) to about 0.9 (cc mm/100 in 2 24 hr atm) at the temperature of about 25° C. under the humidity condition of about 65%.

Since the host layer 531 represents high moisture and oxygen blocking characteristics, the wavelength conversion particles 532 can be effectively protected from external oxygen and/or external moisture.

The wavelength conversion particles 532 are provided in the host layer 531. The wavelength conversion particles 532 are uniformly distributed in the host layer 531.

The wavelength conversion particles 532 convert the wavelength of the light emitted from the light emitting diodes 400. In detail, the wavelength conversion particles 532 receive light emitted from the light emitting diodes 400 to convert the wavelength of the incident light. For instance, the wavelength conversion particles 532 may convert the blue light emitted from the light emitting diodes 400 into the green light and the red light. That is, a part of the wavelength conversion particles 532 may convert the blue light into the green light having the wavelength in the range of about 520 nm to about 560 nm and a part of the wavelength conversion particles 532 may convert the blue light into the red light having the wavelength in the range of about 630 nm to about 660 nm.

In addition, the wavelength conversion particles 532 may convert the UV light emitted from the light emitting diodes 400 into the blue light, the green light and the red light. That is, a part of the wavelength conversion particles 532 may convert the UV light into the blue light having the wavelength in the range of about 430 nm to about 470 nm, and a part of the wavelength conversion particles 532 may convert the UV light into the green light having the wavelength in the range of about 520 nm to about 560 nm. Further, a part of the wavelength conversion particles 532 converts the UV light into the red light having the wavelength in the range of about 630 nm to about 660 nm.

In other words, if the light emitting diodes 400 are blue light emitting diodes that emit the blue light, the wavelength conversion particles 532 capable of converting the blue light into the green light and the red light may be employed. In addition, if the light emitting diodes 400 are UV light emitting diodes that emit the UV light, the wavelength conversion particles 532 capable of converting the UV light into the blue light, the green light and the red light may be employed.

The wavelength conversion particles 532 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle is reduced, so that the fluorescent light having the required wavelength band of visible ray can be generated by adjusting the size of the particles. In addition, the quantum dot represents the extinction coefficient which is 100 to 1000 times higher than that of the general fluorescent pigment and has the superior quantum yield as compared with the general fluorescent pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The optical path change particles 533 are disposed in the host layer 531. The optical path change particles 533 are inserted into the host layer 531. The optical path change particles 533 are uniformly distributed in the host layer 531. The optical path change particles 533 are interposed between the wavelength conversion particles 532.

In addition, a part of the optical path change particles 533 may be inserted into the host layer 531. In other words, the part of the optical path change particles 533 may be exposed out of the host layer 531.

The optical path change particles 533 may be transparent. The optical path change particles 533 may have a lower refractive index or a higher refractive index with respect to the host layer 531. The difference in the refractive index between the optical path change particles 533 and the host layer 531 may be in the range of about 0.3 to about 1.5. In more detail, the difference in the refractive index between the optical path change particles 533 and the host layer 531 may be in the range of about 0.4 to about 1.

The optical path change particles 533 can change the path of the incident light due to the refractive index difference. For example, the optical path change particles 533 can change the path of the incident light due to the reflection and/or the refraction. Accordingly, the optical path change particles 533 can scatter or diffuse the incident light.

For instance, the optical path change particles 533 may include polymethyl methacrylate (PMMA), polycarbonate (PC), or cyclic olefin polymer.

In addition, the optical path change particles 533 may include an inorganic material.

In more detail, the optical path change particles 533 may include a transparent inorganic material. The optical path change particles 533 may include titanium oxide or aluminum oxide.

If the optical path change particles 533 include inorganic materials, the airtightness of the host layer 531 can be improved. Accordingly, the wavelength conversion particles 532 can be effectively protected from external moisture and/or external oxygen by the optical path change particles 533 and the host layer 531.

The optical path change particles 533 may have various shapes. In detail, the optical path change particles 533 may have various shapes such as a spherical shape, a polyhedral shape, a cylindrical shape, or a polyprism shape.

The optical path change particles 533 are larger than the wavelength conversion particles 532. In more detail, the optical path change particles 533 may be 100 times larger than the wavelength conversion particles 532. For instance, the optical path change particles 533 may have a diameter in the range of about 1 μm to about 10 μm.

The first prism sheet 502 is provided on the wavelength conversion diffusion sheet 501. The second prism sheet 503 is formed on the first prism sheet 502. The first and second prism sheets 502 and 503 may enhance the linearity of light passing through the first and second prism sheets 502 and 503.

The liquid crystal panel 20 is disposed on the optical sheets 500. In addition, the liquid crystal panel 20 is disposed on the panel guide 23. The liquid crystal panel 20 is guided by the panel guide 23.

The liquid crystal panel 20 displays images by adjusting intensity of light passing through the liquid crystal panel 20. In detail, the liquid crystal panel 20 is a display panel for displaying the images by using the light emitted from the backlight unit 10. The liquid crystal panel 20 includes a TFT substrate 21, a color filter substrate 22 and a liquid crystal layer interposed between the two substrates. In addition, the liquid crystal panel 20 includes polarizing filters.

Hereinafter, the TFT substrate 21 and the color filter substrate 22 will be described in detail although it is not shown in the drawings in detail. The TFT substrate 21 includes a plurality of gate lines crossing a plurality of data lines to form pixels and a thin film transistor (TFT) is provided at each cross section such that the thin film transistor TFT can be connected to a pixel electrode of the pixel in one-to-one correspondence. The color filter substrate 22 includes color filters having R, G and B colors corresponding to the pixels, a black matrix covering the gate lines, data lines and thin film transistors within the limit of the color filters, and a common electrode covering the above elements.

A driving PCB 25 is provided at an outer peripheral portion of the LCD panel 210 to supply driving signals to the gate lines and data lines.

The driving PCB 25 is electrically connected to the liquid crystal panel 20 by a COF (chip on film) 24. The COF 24 may be replaced with a TCP (tape carrier package).

Since the wavelength conversion diffusion sheet 501 includes the wavelength conversion particles 532 and the optical path change particles 533, the wavelength of the incident light is changed while changing the path of the incident light.

Therefore, the wavelength conversion diffusion sheet 501 can perform both of a wavelength conversion function and a light diffusion function. In other words, although the wavelength conversion diffusion sheet 501 is made of one sheet, the wavelength conversion diffusion sheet 501 can act as both the wavelength conversion sheet and the light diffusion sheet.

As shown in FIG. 3, if the light emitting diodes 400 include blue light emitting diodes, the blue light emitted from the light emitting diodes 400 are output upward through the light guide plate 200. A part of the blue light emitted from the light guide plate 200 can be transmitted. A part of the blue light can converted into green light to be output upward, and a part of the blue light can converted into red light to be output upward.

In this case, as shown in FIG. 4, the path of light passing through the wavelength conversion diffusion sheet 501 can be increased due to the optical path change particles 533. Therefore, light incident onto the wavelength conversion diffusion sheet 501 can be effectively converted by the wavelength conversion particles 532.

In other words, the path of the light incident onto the wavelength conversion diffusion sheet 501 may be changed in a substantially horizontal direction by the optical path change particles 533. As described above, the light having the path changed in the substantially horizontal direction may be more effectively incident onto the wavelength conversion particles 532. Therefore, even if the wavelength conversion diffusion sheet 501 contains a small number of wavelength conversion particles 532, the wavelength conversion diffusion sheet 501 can effectively change the wavelength of the incident light.

In other words, light can be effectively incident onto the wavelength conversion particles 532 due to the optical path change particles 533, so that the utilization of the wavelength conversion particles 532 can be maximized. A small number of wavelength conversion particles 532 can convert a greater amount of light wavelengths due to the combination of the optical path change particles 533 and the wavelength conversion particles 532.

Therefore, the wavelength conversion diffusion sheet 501 can represent more improved color reproduction and more improved brightness with a small number of wavelength conversion particles 532 due to the combination of the optical path change particles 533 and the wavelength conversion particles 532.

Therefore, the LCD according to the embodiment can be easily manufactured while representing improved optical performance.

In addition, the host layer 531 represents the high sealing property. Therefore, the wavelength conversion particles 532 provided in the host layer 531 can be effectively protected from external chemical penetration, such as moisture and oxygen.

Therefore, the wavelength conversion diffusion sheet 501 may have high endurance and reliability.

Figure 5:
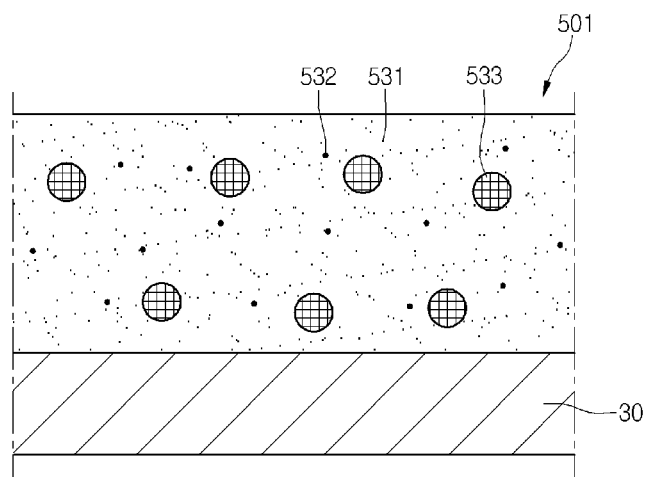
FIGS. 5 to 7 are sectional views showing a process of manufacturing the wavelength conversion diffusion sheet according to the embodiment.
Figure 6:
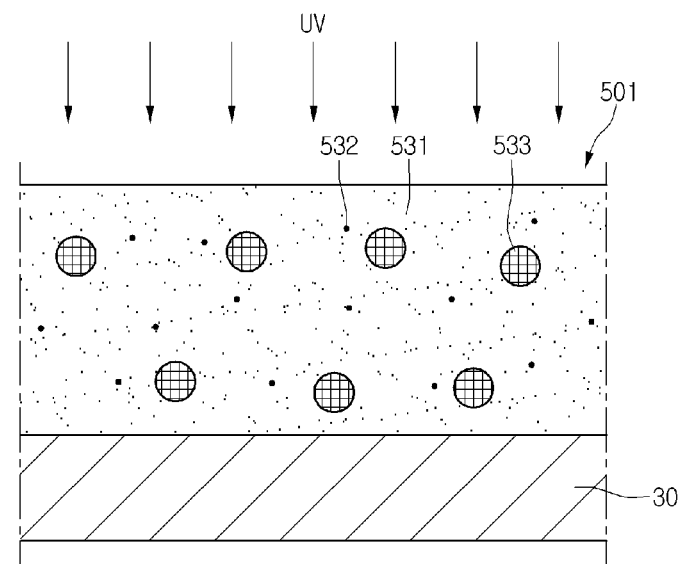
Figure 7:
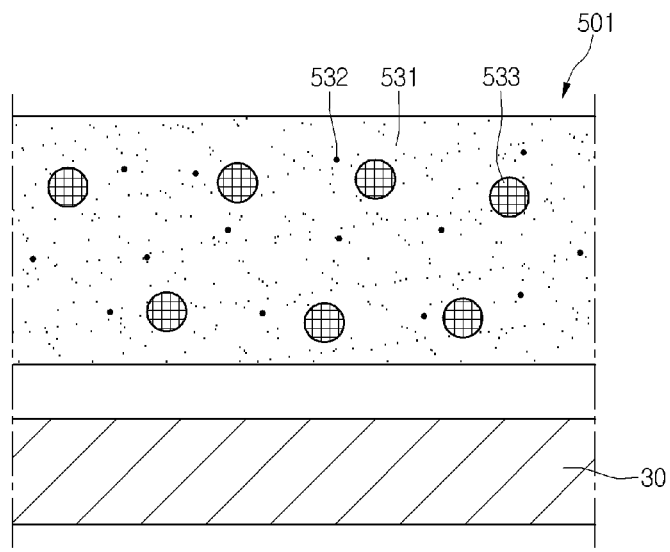
Figure 8:
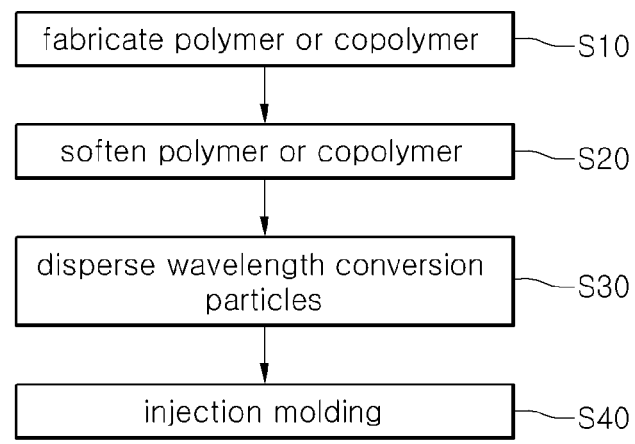
FIGS. 8 and 9 are views showing the process of manufacturing the wavelength conversion diffusion sheet through another method according to the embodiment.
Figure 9:
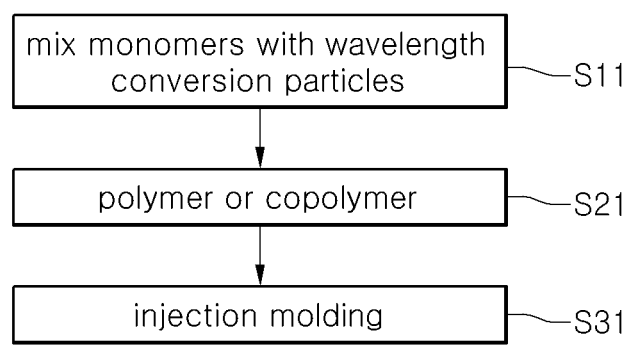
Figure 10:
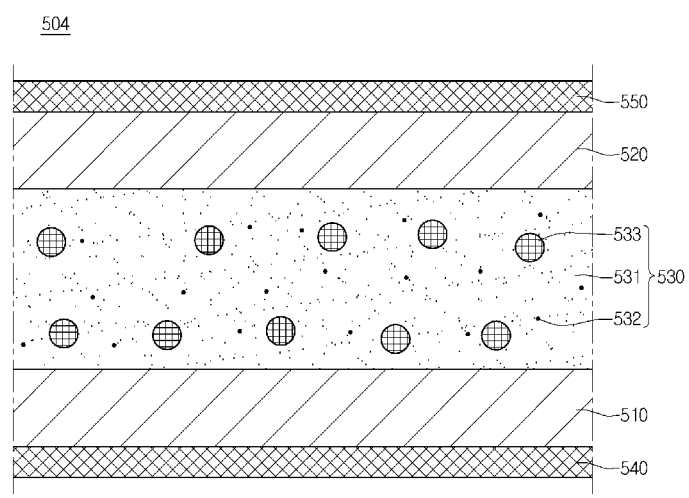
FIG. 10 is a sectional view showing a wavelength conversion diffusion sheet according to another embodiment.

FIGS. 5 to 7 are sectional views showing a process of manufacturing the wavelength conversion diffusion sheet according to the embodiment. FIGS. 8 and 9 are views showing the process of manufacturing the wavelength conversion diffusion sheet through another method according to the embodiment. In the present description about the method for manufacturing the wavelength conversion diffusion sheet, the previous description about the wavelength conversion diffusion sheet will be incorporated by reference. In other words, the previous description about the wavelength conversion diffusion sheet can be essentially associated with the present description about the method for manufacturing the wavelength conversion diffusion sheet.

Referring to FIG. 5, the wavelength conversion particles 532 and the optical path change particles 533 are uniformly mixed in a resin composition 534. The resin composition 534 is transparent. The resin composition 534 may have a light curing characteristic.

The resin composition 534 may include epoxy resin, acrylic resin, polyamic acid, bisphenol-A resin, or silicon resin. In addition, the resin composition 534 may include acrylate monomer, or siloxane monomer.

In addition, the resin composition 534 may include a light curing initiator. The light curing initiator may be selected from the group consisting of α-hydroxyketone, phenylglyoxylate, benzildimethyl ketal, α-aminoketone, mono acyl phosphine, bis acyl phosphine, 2,2-dimethoxy-2-phenylacetophenone, and the compound thereof.

In addition, the resin composition 534 may include the cross linking agent. In addition, the resin composition 534 may further include an addition agent to improve the scaling property. The metal salt such as the platinum salt may be added to the resin composition 534 as the addition agent.

Thereafter, the resin composition 534 is uniformly coated on the top surface of the sacrificial substrate 30. The resin composition 534 may be coated through a spin coating process, a slit coating process, or a spray coating process.

Referring to FIG. 6, UV ray is irradiated into the resin composition 534 coated on the sacrificial surface 30. Accordingly, the resin composition 534 is cured, and the wavelength conversion diffusion sheet 501 is formed on the sacrificial substrate 30.

In addition to the curing process by UV ray, the resin composition 534 may be cured by heat.

Referring to FIG. 7, the sacrificial substrate 30 is removed from the wavelength conversion diffusion sheet 501. The wavelength conversion diffusion sheet 501 may be adapted to a backlight unit 10.

When the host layer 531 includes thermoplastic resin, the wavelength conversion diffusion sheet 501 may be formed through the following processes.

Referring to FIG. 8, a polymer or a copolymer to be contained in the host layer 531 is fabricated (step S10). The polymer or the copolymer may be formed by polymerizing or copolymerizing at least one kind of monomers.

For example, polyvinylidene chloride may be formed by polymerizing a monomer such as vinylidene chloride through suspension polymerization. In addition, the polyvinylidene chloride may be formed by copolymerizing vinylidene chloride and vinyl chloride. In this case, about 75% to about 90% of vinylidene chloride may be copolymerized with about 25% to about 10% of vinyl chloride.

For example, polyacrylionitrille may be formed by radial-polymerizing monomers such as acrylionitrille. In addition, the polyacrylionitrille may be formed by copolymerizing acrylionitrille with monomers such as acrylic acid, esther acrylate, styrenc, or butadiene. In addition, about 50% to about 95% of the acrylionitrille can be copolymerized.

For example, ethylene vinyalchol may be formed by co-polymierizing monomers such as ethylene and vinyl acetate. In other words, the ethylene and the vinyl acetate are copolymerized and saponified under high pressure. Thereafter, over alkali is neutralized.

The polymer or the copolymer may be softened or melted by heat (step S20).

The wavelength conversion particles 532 and the optical path change particles 533 are uniformly distributed into the softened or melted polymer or copolymer (step S30), so that resin composition can be formed.

The resin composition is injection-molded (step S40), so that the wavelength conversion diffusion sheet 501 can be formed.

In addition, referring to FIG. 9, the wavelength conversion diffusion sheet 501 may be formed through the following method.

First, monomers, the wavelength conversion particles 532 and the optical path change particles 533 are uniformly mixed with each other (step S11).

Thereafter, the monomer is polymerized or copolymerized, thereby forming a polymer or a copolymer having the wavelength conversion particles 532 and the optical path change particles 533 uniformly distributed therein (step S21).

Thereafter, the polymer or the copolymer is injection-molded (step S31), so that the wavelength conversion diffusion sheet 501 can be formed.

FIG. 8 is a sectional view showing a wavelength conversion diffusion sheet according to another embodiment. In the present description about the wavelength conversion diffusion sheet, the description about the wavelength conversion diffusion sheet according to the previous embodiments will be incorporated by reference. In other words, the description about the wavelength conversion diffusion sheet according to the previous embodiments can be essentially associated with the present description about the wavelength conversion diffusion sheet except for modified parts of the wavelength conversion diffusion sheet.

Referring to FIG. 8, the wavelength conversion diffusion sheet 504 includes a lower substrate 510, an upper substrate 520, a wavelength conversion layer 530, a first inorganic protective layer 540, and a second inorganic protective layer 550.

The lower substrate 510 is provided under the wavelength conversion layer 530. The lower substrate 510 may be transparent and flexible. The lower substrate 510 may adhere to a bottom surface of the wavelength conversion layer 530.

The lower substrate 510 may include a transparent polymer, such as polyethyleneterephthalate (PET).

The upper substrate 520 is disposed on the wavelength conversion layer 530. The upper substrate 520 may be transparent and flexible. The upper substrate 520 may adhere to the top surface of the wavelength conversion layer 530.

The upper substrate 520 may include a transparent polymer such as polyethyleneterephthalate (PET).

The wavelength conversion layer 530 is sandwiched between the upper and lower substrates 520 and 510. The upper and lower substrates 520 and 510 support the wavelength conversion layer 530. The upper and lower substrates 520 and 510 protect the wavelength conversion layer 530 from external physical impact.

In addition, the upper and lower substrates 520 and 510 have a low oxygen transmission rate and low moisture permeability. Thus, the upper and lower substrates 520 and 510 can protect the wavelength conversion layer 530 from external chemical penetration, such as oxygen and/or moisture.

The wavelength conversion layer 530 may have the same components as those of the wavelength conversion diffusion sheet 501 of a single layer according to the prior embodiment. In other words, the wavelength conversion layer 530 includes the host layer 531, a plurality of wavelength conversion particles 532, and a plurality of optical path change particles 533.

The first inorganic protective layer 540 is provided below the lower substrata 510. The first inorganic protective layer 540 may be coated on the bottom surface of the lower substrate 510.

The refractive index of the first inorganic protective layer 530 may have a refractive index lower than that of the lower substrate 510. The first inorganic protective layer 540 may include silicon oxide.

The second inorganic protective layer 550 is provided on the upper substrate 520. The second inorganic protective layer 550 may be coated on the top surface of the upper substrate 520.

The refractive index of the second inorganic protective layer 550 may be lower than the refractive index of the upper substrate 520. The second inorganic protective layer 550 may include silicon oxide (SixOy).

The wavelength conversion layer 530 is sandwiched between the lower and upper substrates 510 and 520, and the first and second inorganic protective layers 540 and 550. Therefore, the lower and upper substrates 510 and 520, and the first and second inorganic protective layers 540 and 550 protect the wavelength conversion particles 532 from chemical penetration such as external moisture and/or oxygen.

Therefore, the wavelength conversion diffusion sheet 501 according to the present embodiment can represent high endurance and high reliability.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. An optical member comprising:
an upper substrate;
a lower substrate; and
a wavelength conversion diffusion sheet between an inner surface of the upper substrate and an inner surface of the lower substrate,
wherein the wavelength conversion diffusion sheet comprises:
a host layer;
optical path change particles in the host layer; and
wavelength conversion particles in the host layer,
wherein the wavelength conversion particles include a plurality of quantum dots,
a first inorganic protective layer disposed under the lower substrate and a second inorganic protective layer disposed above the upper substrate,
wherein the first inorganic protective layer and the second inorganic protective layer comprise an oxide layer,
wherein the optical path change particles and the plurality of quantum dots are disposed within the host layer that is a single host layer sandwiched between the inner surface of the upper substrate and the inner surface of the lower substrate,
wherein the second inorganic protective layer is at an outer surface of the upper substrate and the first inorganic protective layer is at an outer surface of the lower substrate,
wherein portions of the first inorganic protective layer and the second inorganic protective layer extend only parallel to each other and to the outer surface of the upper substrate and the outer surface of the lower substrate,
wherein the upper substrate and the lower substrate include polyethyleneterephthalate (PET),
wherein a refractive index of the optical path change particles is higher than a refractive index of the host layer,
wherein the optical path change particles include a metal oxide,
wherein the first inorganic protective layer and the second inorganic protective layer are at outer surfaces of the optical member,
wherein the host layer does not make contact with the first inorganic protective layer and the second inorganic protective layer, wherein the host layer has a refractive index in the range of about 1.4 to about 1.6, wherein the host layer includes a silicon resin, a cross linking agent and a platinum salt, and the host layer contain 20 wt % to 25 wt % of the cross linking agent, and the host layer contain 0.001 wt % to 0.01 wt % of the platinum salt, and wherein a moisture transmission rate of the host layer is in the range of 0.05 (cc mm/100 in$^2$ 24 hr atm) to 0.9 (cc mm/100 in$^2$ 24 hr atm) at the temperature of 25° C. under the humidity condition of 65%.

2. The optical member of claim 1, wherein the optical path change particles are transparent.

3. The optical member of claim 1, wherein each of the optical path change particles is at least one of entirely disposed in the host layer and uniformly distributed in the host layer.

4. The optical member of claim 1, wherein the optical path change particles are interposed between the wavelength conversion particles.

5. The optical member of claim 1, wherein the wavelength conversion particles and the optical path change particles are uniformly distributed in the host layer.

6. A display device comprising:
a light source to output light;
an optical member to convert the light from the light source; and
a display panel provided on the optical member to receive the light converted by the optical member,
wherein the optical member comprises:
an upper substrate;
a lower substrate; and
a wavelength conversion diffusion sheet between an inner surface of the upper substrate and an inner surface of the lower substrate,
wherein the wavelength conversion diffusion sheet comprises;
a host layer;
optical path change particles in the host layer; and
wavelength conversion particles in the host layer,
wherein the wavelength conversion particles comprise a plurality of quantum dots,
wherein the optical path change particles and the plurality of quantum dots are disposed within the host layer that is a single host layer sandwiched between the inner surface of the upper substrate and the inner surface of the lower substrate,
a first inorganic protective layer disposed under the lower substrate and a second inorganic protective layer disposed above the upper substrate,
wherein the first inorganic protective layer and the second inorganic protective layer comprise an oxide layer,
wherein the second inorganic protective layer is at an outer surface of the upper substrate and the first inorganic protective layer is at an outer surface of the lower substrate,
wherein portions of the first inorganic protective layer and the second inorganic protective layer extend only parallel to each other and to the outer surface of the upper substrate and the outer surface of the lower substrate,
wherein the upper substrate and the lower substrate include polyethyleneterephthalate (PET),
wherein a refractive index of the optical path change particles is higher than a refractive index of the host layer,
wherein the optical path change particles include a metal oxide,
wherein the first inorganic protective layer and the second inorganic protective layer are at outer surfaces of the optical member,
wherein the host layer does not make contact with the first inorganic protective layer and the second inorganic protective layer,
wherein the host layer has a refractive index in the range of about 1.4 to about 1.6,
wherein the optical path change particles have a lower refractive index refractive index with respect to the host layer,
wherein the host layer includes a silicon resin, a cross linking agent and a platinum salt, and the host layer contain 20 wt % to 25 wt % of the cross linking agent, and the host layer contain 0.001 wt % to 0.01 wt% of the platinum salt, and
wherein a moisture transmission rate of the host layer is in the range of 0.05 (cc mm/100 in$^2$ 24 hr atm) to 0.9 (cc mm/100 in$^2$ 24 hr atm) at the temperature of 25° C. under the humidity condition of 65%.

7. The display device of claim 6, wherein the optical path change particles are transparent.

* * * * *